Aug. 8, 1950     E. F. PETERSON     2,518,250
MACHINE VIBRATOR
Filed May 27, 1948
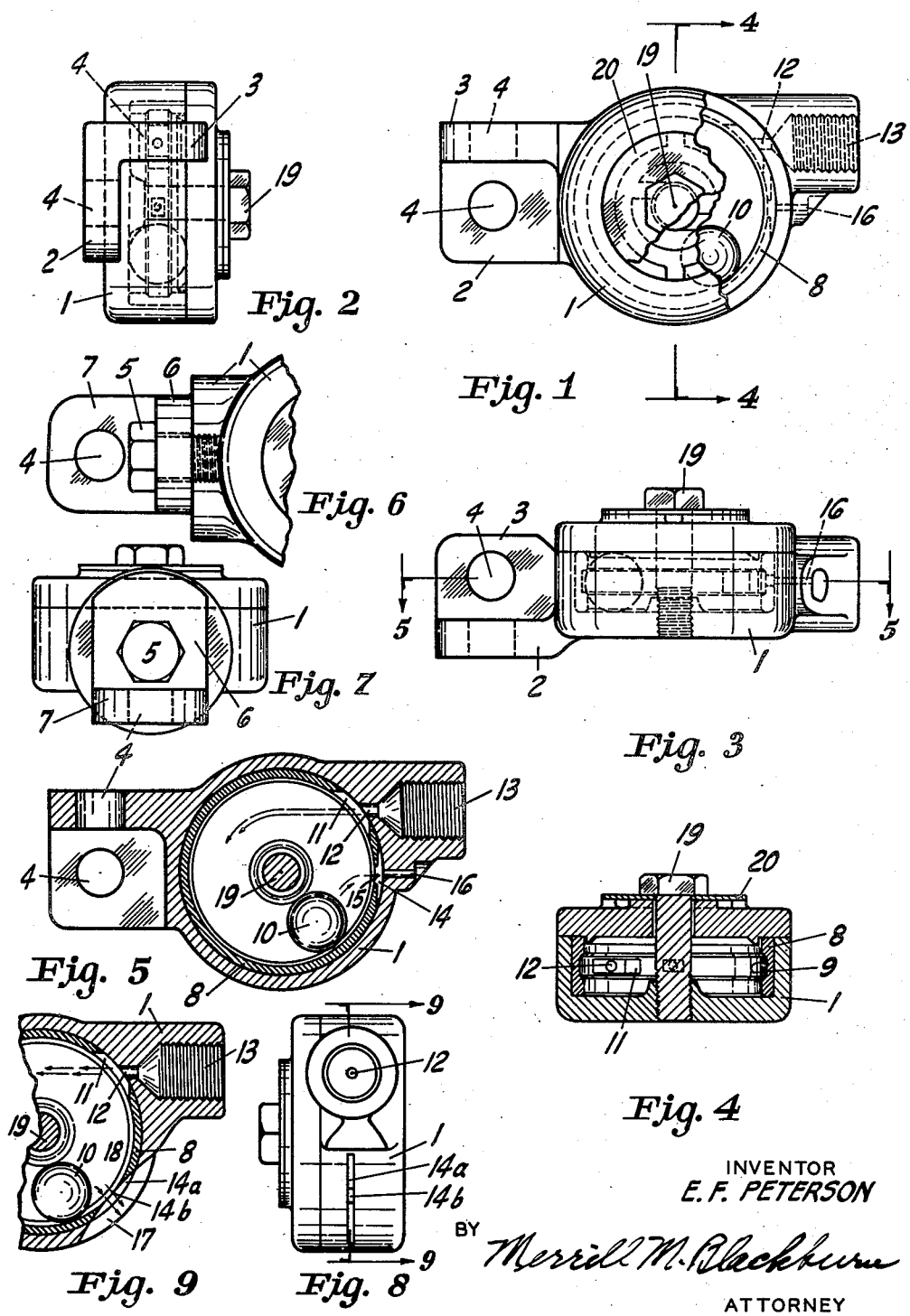
INVENTOR
E. F. PETERSON
BY Merrill M. Blackburn
ATTORNEY Patented Aug. 8, 1950

2,518,250

UNITED STATES PATENT OFFICE 2,518,250

MACHINE VIBRATOR

Edwin F. Peterson, Kewanee, Ill.

Application May 27, 1948, Serial No. 29,620

2 Claims. (Cl. 259—72)

My present invention relates to an instrumentality for use in the molding art, and more particularly to improvements upon the structures shown in my prior applications, Serial No. 543,-863, No. 620,119, and Patent No. 2,480,603. The improvements consist especially in providing escape for any foreign matter which might otherwise find lodgment within the cavity of the vibrator, so that the ball raceway will not stand any chance of having any such foreign matter built up on its surface, and, also, in providing a modified and improved mounting bracket for the vibrator.

In the drawings annexed hereto and forming a part hereof,

Fig. 1 is a plan view, partly broken away, of a vibrator embodying one form of my invention;

Fig. 2 is an end view of the structure shown in Fig. 1, looking at it from the left hand side of that figure.

Fig. 3 is an edge view of the structure shown in Fig. 1;

Fig. 4 shows a transverse section taken substantially along the plane indicated by the line 4—4, Fig. 1;

Fig. 5 represents a longitudinal section of the structure shown in Figs. 1 and 3, the same being taken substantially along the plane indicated by the line 5—5, Fig. 3;

Fig. 6 shows a modified form of the bracket by means of which the vibrator is connected to the part to be vibrated, this being so constructed that the direction of vibration is not limited to two planes but the vibrator may be turned to vibrate in a great number of planes;

Fig. 7 is an end view of the structure shown in Fig. 6;

Fig. 8 shows a vibrator provided with a modified form of vent; and

Fig. 9 shows a fragmentary medial section taken substantially along the plane indicated by the line 9—9, Fig. 8.

Reference will now be made in greater detail to the annexed drawings for a more complete description of this invention. The vibrator body 1 is shown in Figs. 1, 2, 3, and 5 as being provided with an attaching bracket comprising the arms 2 and 3 arranged at a right angle to each other and provided with holes 4 for the reception of the bolts whereby the vibrator can be attached to a match plate or other structure which is to be vibrated. By means of this present device, instead of a projecting lug which is substantially square in cross-section, the weight of the vibrator can be considerably reduced, and this is important in a structure of this kind in which it is desirable to have the ratio of the weight of the ball to the weight of its casing comparatively large.

Figs. 6 and 7 show a modified form of bracket comprising two arms at a right angle to each other, one of them being attached to the body 1 of the vibrator, by means of a bolt 5 which passes through the arm 6 of the bracket and into the body 1 of the vibrator, as shown in Fig. 6. The other arm, 7, of the bracket has a hole 4 therethrough for attachment to the structure which is to be vibrated. When the bracket has been attached to this structure, the vibrator may be turned to vibrate in any one of many planes by loosening the bolt 5, turning the body 1 to the desired plane of vibration, and again tightening the bolt.

Inside of the body 1 is a substantially cylindrical opening which has fitted therein a ring 8 provided with a groove 9, the edges of which form a trackway upon which the ball 10 rolls. In the bottom of the groove 9 is formed a cut 11 extending completely through the wall of the ring 8, as shown in Fig. 5, and into this opens an air inlet 12 connecting the interior of the body with a screw-threaded opening 13, provided for the attachment of a suitable air hose. From Fig. 5 it will be apparent that air, passing under pressure through the openings 12 and 11, enters the body approximately tangentially and at a point such that it delivers the greatest force to the ball 10.

A second opening or slot 14 or 14a is cut through the outer surface of the ring 8, either completely or nearly through the ring, as shown, respectively, in Figs. 5 and 9. In Fig. 5 is shown a hole 15 connecting the slot 14 with the interior of the body 1, while in Fig. 9, the slot 14a is shown as being cut completely through the ring 8. In Fig. 5 there is shown a hole 16 connecting the slot 14 with the exterior air, while in Fig. 9 is shown a slot 17 cut through the wall of the body 1 to connect the internal cavity 18 of the body with the external air. This connection between the slot 14a and the internal cavity 18 is indicated in Figs. 8 and 9 at 14b.

It will be seen from the foregoing that I have provided different, but similar, ways for venting sand or other foreign matter from the interior of the body, the same being, in both instances, blown out of the body by a part of the air admitted through the air inlet opening. The remainder of the air may pass outwardly around the bolt 19 which connects the two halves of the body together. As shown in my prior applications and patent, above identified, the air passes out around the bolt 19 through grooves under the washer 20. It is not believed necessary to disclose these outlets in detail in view of the fact that they are disclosed fully in the above identified applications.

It is of course understood that the specific description of structure set forth above may be departed from without departing from the spirit of this invention as disclosed herein and as defined in the appended claims.

Having now described my invention, I claim:

1. A mechanical vibrator comprising a chamber having an air inlet and an air outlet, said chamber comprising a cylindrical shell having one closed end, a cover for closing the other end of said cylinder, a pair of circular tracks slidably contained within said shell, said tracks being spaced apart to provide a circular passage therebetween for the movement of dirt, said inlet and outlet both being located between said tracks, and a ball within said chamber of a size to roll on said pair of tracks, whereby air entering said chamber will roll said ball on said tracks, and dirt entering with said air will move into said passage between said tracks and out of the outlet.

2. A mechanical vibrator as defined in claim 1 in which a second outlet is provided from said chamber in a position substantially axially of said cylinder.

EDWIN F. PETERSON.

REFERENCES CITED

The following references are of record in the file of this patent:

UNITED STATES PATENTS

| Number | Name | Date |
|---|---|---|
| 1,336,921 | Pickop | Apr. 13, 1920 |
| 1,346,221 | Liedtke | July 13, 1920 |
| 1,713,551 | Pickop | May 21, 1929 |
| 1,820,320 | Pickop | Aug. 25, 1931 |
| 2,078,983 | Thiberge | May 4, 1937 |
| 2,142,237 | Canady | Jan. 3, 1939 |
| 2,175,321 | Saffir | Oct. 10, 1939 |
| 2,469,525 | Skrob | May 10, 1949 |